C. MINEART AND H. J. COLE.
CORN PLANTER MARKER.
APPLICATION FILED FEB. 18, 1920.

1,403,908.

Patented Jan. 17, 1922.
2 SHEETS—SHEET 1.

Inventors
C. Mineart, and
H. J. Cole.

By D. Swift

Their Attorney

C. MINEART AND H. J. COLE.
CORN PLANTER MARKER.
APPLICATION FILED FEB. 18, 1920.

1,403,908.

Patented Jan. 17, 1922.
2 SHEETS—SHEET 2.

Inventors
C. Mineart, and
H. J. Cole.

By D. Swift
their Attorney

UNITED STATES PATENT OFFICE.

CHRIST MINEART AND HUGH J. COLE, OF BRIGHTON, IOWA.

CORN-PLANTER MARKER.

1,403,908.  Specification of Letters Patent.  Patented Jan. 17, 1922.

Application filed February 18, 1920. Serial No. 359,736.

*To all whom it may concern:*

Be it known that we, CHRIST MINEART and HUGH J. COLE, citizens of the United States, residing at Brighton, in the county of Washington, State of Iowa, have invented a new and useful Corn-Planter Marker; and we do hereby declare the following to be a full, clear, and exact description of the invention, such as will enable others skilled in the art to which it appertains to make and use the same.

The invention relates to corn planter markers and has for its object to provide marker arms having universal connections to the sides of the planter, said arms being so connected to each other that when one marker arm is extended the other arm is folded in direction of the side of the planter, said connection between the arms being a flexible one and also performing the function of a stay for holding the extended marker arm. Also to provide lever means whereby the extended arm may be supported while in use.

A further object is to provide a flexible connection between the levers and the marker arms so that the extended arm may be raised vertically on its universal joint when passing trees and other obstructions which may be in line with the marker arm.

A further object is to provide a flexible rope connection between the ends of the marker arms, which connection passes through eyes, located on the planter frame and disposed forwardly of the pivotal points of the marker arms. The rope being of such a length that when one marker arm is extended at right angles to the planter the other marker arm will be folded to the side of the planter.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1:
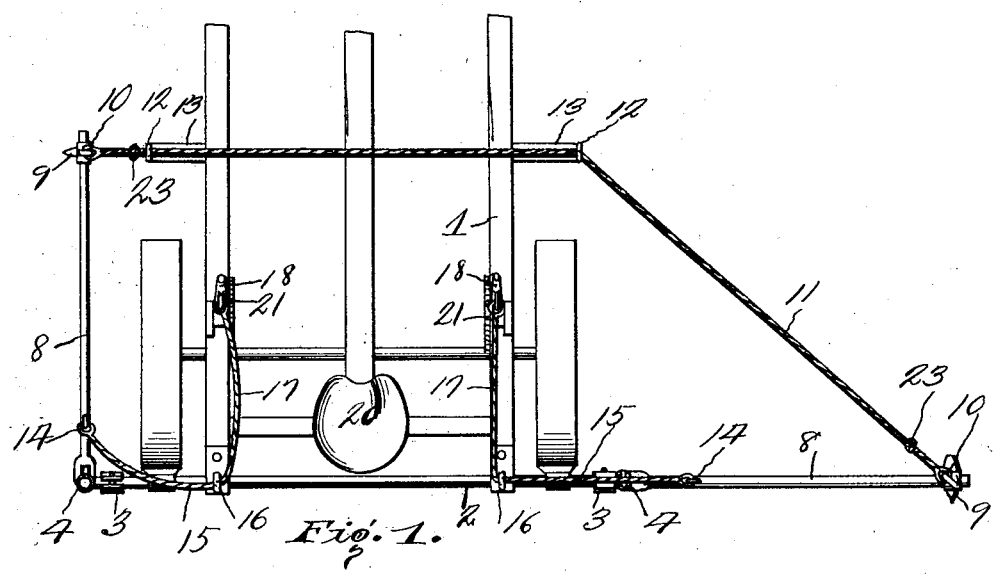
Figure 1 is a plan view of the rear end of a planter showing the marking device attached thereto.
Figure 2:
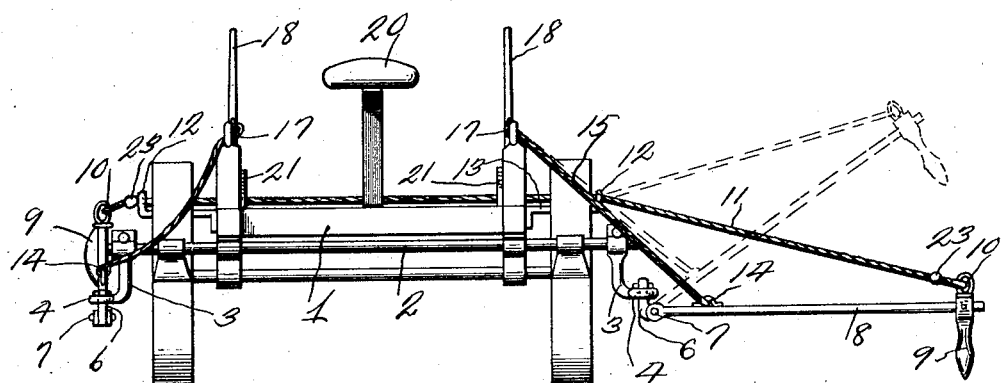
Figure 2 is a rear view of the planter and marking devices.
Figure 3:
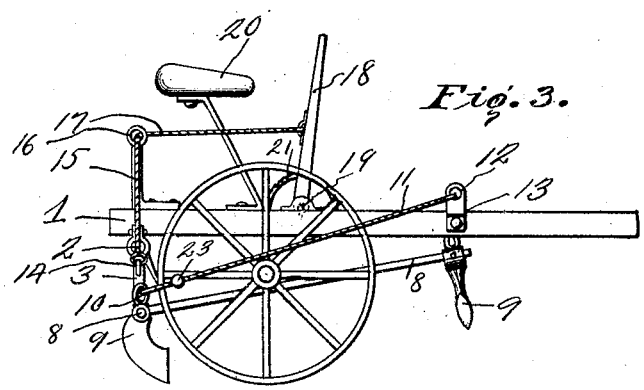
Figure 3 is a side view of the planter.
Figure 4:
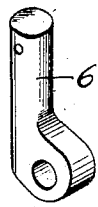
Figure 4 is a detail view of one of the members forming the universal connection of the marker arms.
Figure 5:
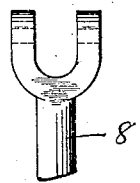
Figure 5 is a detail view of the inner end of one of the marker arms showing the other member of the universal connection.
Figure 6:
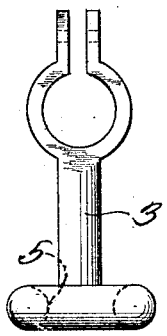
Figure 6 is a detail view of one of the downwardly extending brackets carried by the scraper bar of the planter for supporting the marker arm.
Figure 7:
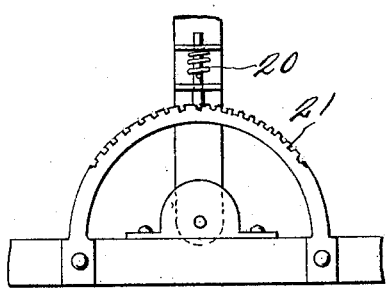
Figure 7 is a detail view of one of the segmental racks for one of the raising levers.

Referring to the drawings, the numeral 1 designates a planter and 2 the wheel scraper bar carried at the rear end thereof. Secured to the ends of the bar 2 are brackets 3 which brackets extend downwardly and terminate in right angled portions 4, which portions are provided with vertical bearings 5. Pivotally mounted in the bearings 5 so that they will pivot in a horizontal plane are downwardly extending members 6 which members have pivotally connected to their lower ends as at 7 marker arms 8. The pivotal points 7 are so constructed that the marker arms 8 may be pivoted vertically, however, pivotal points 7 in connection with the horizontal pivoted members 6 form universal connections for the marker arms 8 so that they may be pivoted upwardly at any angle. Secured to the outer ends of the marker arms 8 are markers 9, which markers are adapted to engage the ground and score lines so that the operator of the planter may properly space the rows during a planting operation. However, during a planting operation only one marker is extended and that marker being the one on the side of the row being planted on which it is the intention of the operator to return after reaching the end of the row he is planting.

Secured to the ends of the marker arms as at 10 is a rope 11, which rope passes through eyes 12, carried by brackets 13 on the sides of the frame of the planter. Brackets 13 are located forwardly of the marker arms and their eyes form means for guiding the rope 11 during the sliding movement of the rope when either of the marker arms are being moved outwardly to marking position, or inwardly to a position where they will extend substantially parallel with the planter and be out of use. Brackets 13 are located at a greater height above the ground than the universal connections of the marker arms so that when either of the marker arms is rigged inwardly its outer end will be raised so that it will not be in the path of obstructions or engage the ground. The rope 11 is of sufficient length so that when one marker arm is extended the other marker arm will be rigged in. By referring to Figure 1, it will be seen that the rope 11 also forms a stay for holding the extending marker arm against rearward movement during a marking operation. Connected to the marker arms 8 as at 14 is a rope 15 which rope extends upwardly and through an eye 16 carried by the frame 1. Rope 15 has its portions 17 extending forwardly and connected to levers 18, which levers are pivoted to the frame as at 19 and are provided with detents 20 adapted to cooperate with a toothed segment 21 so that the levers may be held in any position to which they are moved. By providing the ropes 15 it will be seen that when the operator who occupies the seat 22 sees that he is approaching an obstruction which would come into engagement with the marker arm that is extended he grasps one of the levers 18 and forces the same forwardly which will cause the extended marker arm to be pivoted upwardly thereby allowing the planter and marker to pass the obstruction. This is particularly advantageous in avoiding trees. Rope 11 near its ends is provided with enlargements 23 adapted to engage the eyes 12 so as to limit the inward and outward movement of either arm 8. Enlargements 23 also prevent the marker arms when rigged inwardly to come too close to the side of the planter frame.

From the above it will be seen that a planter marker is provided which may be easily rigged inwardly or extended and by universally supporting the inner ends of the marker arms, said marker arms may when in extended positions be easily raised vertically so as to avoid trees and other obstructions.

The invention having been set forth what is claimed as new and useful is:—

The combination with a planter, of markers for said planter, said markers comprising a pair of arms, universally pivoted to the planter, a rope connection between the ends of the marker arms, said rope connection being slidably mounted in a guide of the planter, said guide being located forwardly of the universal connections of the marker arms, the rope being of such a length whereby as one marker arm is extended the other marker arm will be folded to the side of the planter, ropes connected to the marker arms, said ropes extending upwardly and inwardly and passing through eyes carried by the planter frame and disposed in the same transverse vertical plane as the universal connections of the arms, said ropes beyond the eyes extending forwardly and having their ends connected to levers, means for holding the levers in any position to which they may be moved, said levers and rope connections to the marker arms forming means whereby the marker arms may be raised as desired, said rope connections to the marker arms also forming means whereby the marker arms will be allowed to swing inwardly when one of the marker arms is extended.

In testimony whereof we have signed our names to this specification in the presence of two subscribing witnesses.

CHRIST MINEART.
HUGH J. COLE.

Witnesses:
P. W. MINEART,
EDGAR ROTZINGER.